Figure 1:
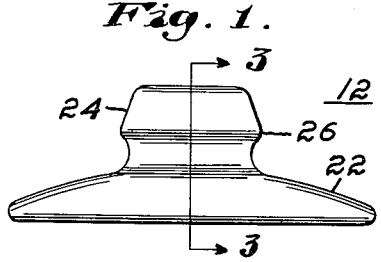
Figure 3:
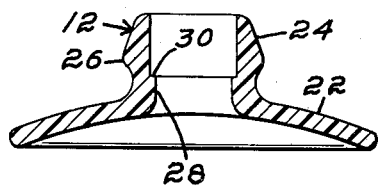
Figure 2:
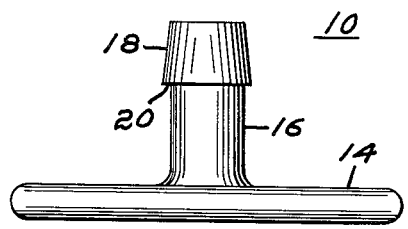
Figure 4:
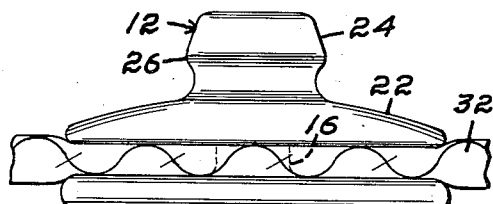
Figure 6:
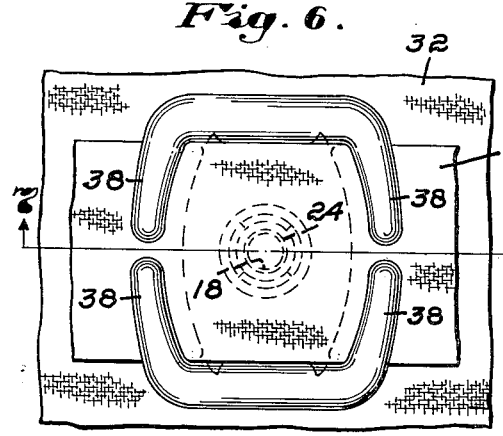
Figure 5:
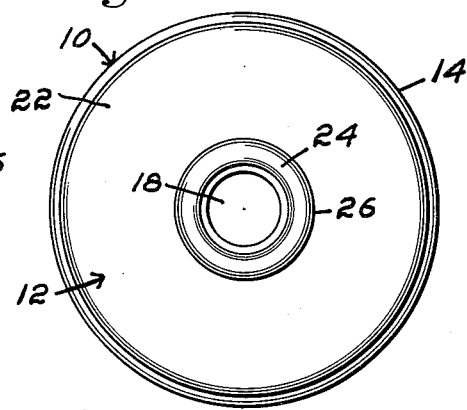
Figure 7:
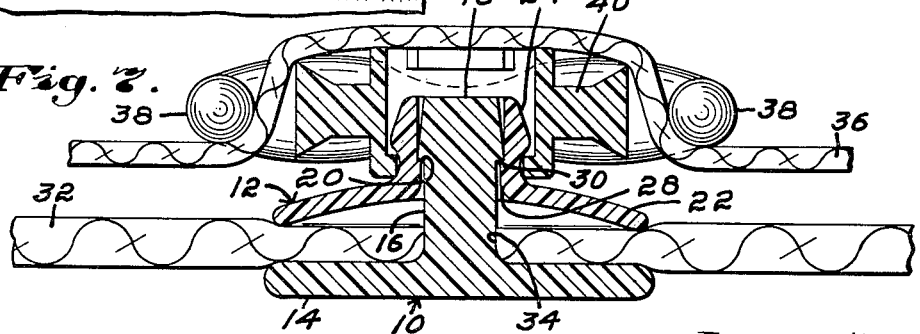

Aug. 21, 1962     L. F. LEWIN     3,049,777

TWO-PIECE PLASTIC STUD

Filed Nov. 4, 1960

Inventor:
Leon F. Lewin,
by Walter S. Jones
Atty.

United States Patent Office 3,049,777

Patented Aug. 21, 1962

1

3,049,777
TWO-PIECE PLASTIC STUD

Leon F. Lewin, Wollaston, Mass., assignor to United-Carr Fastener Corporation, Cambridge, Mass., a corporation of Delaware Filed Nov. 4, 1960, Ser. No. 67,207
3 Claims. (Cl. 24—213)

This invention relates to fastening devices and more specifically to the male member of a snap fastener assembly.

An object of the invention is to provide a two piece male member of a snap fastener assembly which is capable of being mechanically fastened to an apertured support.

A further object of the invention is to provide a snap fastener stud capable of being fastened to an apertured support through a snap action.

A still further object of the invention is to provide a snap fastener stud whose area of attachment to an apertured support will provide its own waterproof seal.

Other objects of the invention will, in part, be obvious, and will, in part, appear hereinafter.

In the drawing:

FIG. 1 is a side elevation of the receptacle portion of the new fastener stud;

FIG. 2 is a side elevation of the post member of the new fastener stud;

FIG. 3 is a cross section taken on the line 3—3 of FIG. 1;

FIG. 4 is a side elevation of the fastener stud assembled on a cloth support, the cloth support broken off at both ends;

FIG. 5 is a top plan view of the fastener elements assembled;

FIG. 6 is a top plan view of the fastener stud assembled on a cloth support and with a buckle having a socket; and FIG. 7 is a section taken on the line 7—7 of FIG. 6.

Referring to the drawing, particularly FIGS. 1 through 4, there is shown a snap fastener stud of flexible material, such as yieldable molded plastic, comprising a post member 10 and a receptacle member 12. The said post member 10 is preferably formed of molded plastic material and comprises a circular base flange 14 and a cylindrical rod element 16 integral with said base flange 14, extending in a direction away from said base flange 14 and having an axis on the same plane as the axis of said base flange 14. The said rod element 16 has a free terminal end portion 18 in the form of a truncated cone having the diameter of its base end greater than the diameter of the remaining portion of said rod element 16 to form an external circumferential shoulder 20 as shown in FIG. 2. The said receptacle member 12 comprises a cover flange 22 in the form of a shallow circular concave dish, and a tubular stud portion 24 open at both ends. The said stud portion 24 is integral with said cover flange 22 and in axial alignment thereto. The outer surface of said stud portion 24 is shaped to form a diverging, converging surface forming at its widest portion a convex projection 26. The inner surface 28 of said stud portion 24 has an inner continuous radially yieldable circumferential shoulder 30 formed a predetermined distance from said cover flange 22 and projecting into a portion of the area circumscribed by said inner surface 28.

A support 32 of cloth or plastic material may be engaged with the applicant's stud. The said support 32 has an inner circular wall 34 formed therethrough to define an aperture.

To engage said post member 10 and said receptacle member 12 to each other and to said support 32, the free terminal end portion 18 of said post member 10 is passed through the aperture surrounded by said inner wall 34 of said support 32 until the base flange 14 is abutted and

2 superposed by the portion of said support 32 adjacent said inner wall 34. Obviously, the diameter of said base flange 14 is greater than the diameter of the area defined by said inner wall 34. In this position, the greater portion of the rod element 16 will extend beyond the plane of said support 32.

The free terminal end 18 of the said rod element 16 is now passed through the area enclosed by the concavity of said cover flange 22 and thence into an aperture surrounded by the inner surface 28 of said stud portion 24. The larger diameter of the free terminal end portion 18 is formed slightly greater than the diameter of the area encompassed by the inner surface 28 between said inner shoulder 30 and said cover flange 22. The free terminal end portion 18 is forced by the inner surface 28 by expanding the inner surface 28 away from the axis of said receptacle member 12 until the shoulder 20 of said post member 10 snaps into abutting, superimposed relationship with the inner shoulder 30 of said receptacle member 12. The dimensions of the receptacle member 12 are made in such a manner that when the external circumferential shoulder 20 of the post member 10 abuts the inner shoulder 30 of the receptacle member 12 the support 32 is effectively sandwiched between the base flange 14 and the cover flange 22. The concavity of the cover flange 22 allows it to flex against the support 32 increasing the holding force placed on the support 32 and between the post member 10 and the receptacle member 12. After attachment to the support 32 the stud can be engaged with numerous different types of snap fastener sockets, one of which is shown at FIG. 6. This particular type of socket is used on a strap 36 and comprises a pair of opposed arms 38 which are attached to a base portion 40 whereby the arms 38 rest on one side of the strap 36 and the base portion 40 rests on the opposite side of the strap 36. A socket can be formed in the base portion 40 capable of snap engagement to the stud portion 24 of the receptacle member 12 as shown in cross section in FIG. 7.

Since certain other obvious modifications may be made in this device without departing from the scope of the invention, it is intended that all matter contained herein be interperted in an illustrative and not in a limiting sense.

I claim:

1. A snap fastener stud unit comprising a post element and a snap fastener stud receptacle element, said post element comprising a base flange and a rod element in axial relationship with said base flange, and extending away from the plane of said base flange, said rod element having a free end in the form of a cone, an external circumferential shoulder on said rod element, said receptacle element comprising an apertured arcuate flange portion at one end and a tubular upstanding snap fastener stud portion, said stud portion having an internal continuous radially yieldable circumferential shoulder formed therein for cooperative engagement with said circumferential shoulder of said rod element.

2. A snap fastener stud unit comprising a post element and a snap fastener stud receptacle element each formed of yieldable plastic, said post element comprising a base flange and a rod element, said rod element in angular relation with said base flange, extending away from said base flange and having an external shoulder circumscribing a portion of said rod element, said stud receptacle element comprising an apertured flange portion and a tubular snap fastener stud portion extending away from said flange portion, said stud portion having a continuous internal shoulder formed therein for cooperative engagement with said external shoulder of said rod element, one of said shoulders being radially yieldable, and at least one of said flanges being arcuate in cross section.

3. The combination of a snap fastener stud unit and a support, said snap fastener stud comprising a post element and a receptacle element, said post element comprising a base flange and a rod element, said rod element in angular relation with said base flange, extending away from said base flange and having an abrupt external shoulder circumscribing a portion of said rod element, said snap fastener stud receptacle element comprising an apertured flange portion and a tubular stud portion extending away from said apertured flange portion, said stud portion having an internal continuous abrupt shoulder formed therein for cooperative engagement with said external shoulder of said rod element, said support being interposed in gripping relationship between said apertured flange portion and said base flange portion on engagement of said post and receptacle elements.

References Cited in the file of this patent

UNITED STATES PATENTS

| | | |
|---|---|---|
| 347,887 | Pringle | Aug. 24, 1886 |
| 737,874 | Shipman | Sept. 1, 1903 |
| 2,851,756 | Jones | Sept. 16, 1958 |

FOREIGN PATENTS

| | | |
|---|---|---|
| 117,961 | Germany | Feb. 20, 1901 |